May 3, 1927.
E. T. CURRAN
AUTOMOBILE RADIATOR THERMOMETER
Filed March 30, 1921
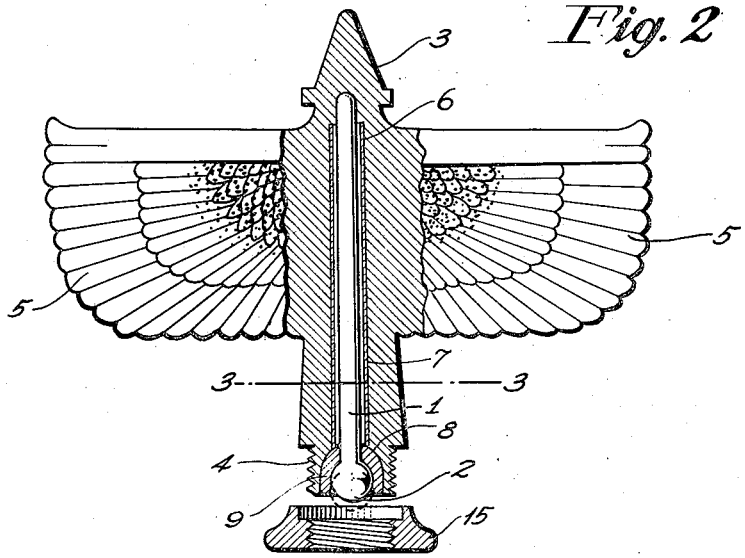
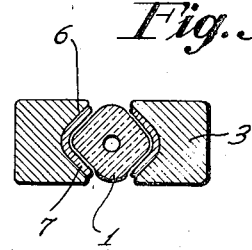
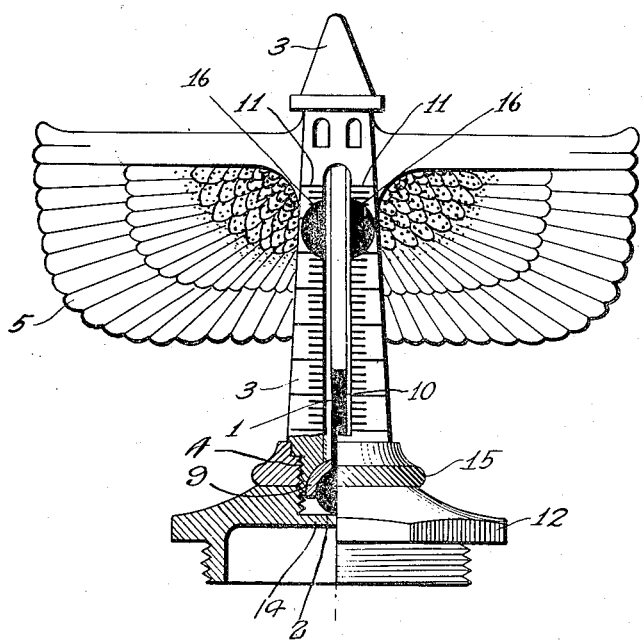
INVENTOR
Edward T. Curran
BY
Jas. H. Griffin
ATTORNEY Patented May 3, 1927.

1,626,790

UNITED STATES PATENT OFFICE.

EDWARD T. CURRAN, OF DETROIT, MICHIGAN.

AUTOMOBILE RADIATOR THERMOMETER.

Application filed March 30, 1921. Serial No. 456,916.

This invention pertains to the method of indicating temperatures of the cooling liquids in automobile radiators and a thermometer for practicing the method. The thermometer is mounted on the radiator cap, the temperature of which is imparted, by conductivity, to the thermometer and the object of employing a thermometer in accordance with this invention is to enable the operator to ascertain at a glance the temperature of the cooling system of the motor whereby he is advised of the temperature of the cooling fluid therein. The thermometer, when properly carrying out its functions, will show at a glance the temperature of the metal of the cap and associated parts of the radiator which temperature, in practice, is found to be a fair measure of the temperature of the liquid in the cooling system.

Two distinct types of mechanism are now in common usage, both of which include thermometer tubes and which differ from one another mainly in the positioning of the bulb of the tube. In one apparatus which is used quite extensively, the heat indicating tube projects through the radiator cap into the commonly found conventional air space in the filler neck or upper tank of the radiator and the heat indicating fluid is caused to function by the presence of heated vapor or steam in said filler neck or upper tank. In practice, the vapor or steam displaces or dries out the air normally present within the filler neck or upper tank and thus comes in contact with and operates the indicating tube. Accordingly, in the said apparatus, the tube operates only when steam or vapor develops within the upper tank of the radiator and at other times the thermometer tube does not function. In other words, it does not give any distinct reading as to the actual temperature of the water in the radiator, but is so organized that the mercury column is suddenly brought into view in the event of the generation of highly heated vapor or steam in the radiator. It is thus purely a device for indicating overheating.

It is quite common that the water in a radiator may be much hotter than the air above its surface in the upper tank of the radiator, due to the same principles of air insulation which enable a thermometer, hung on the wall of the room, to register 70 or 80 degrees F. when the room contains several vats of boiling water. Manifestly, no accurate reading of the water or other liquid temperatures can be obtained by a heat indicator which projects into an air space above the surface of the liquid. The device in question is therefore purely an indicator for overheating and no accurate reading of actual temperatures can be obtained.

In the second mentioned form of apparatus, a thermometer tube is supported on the radiator cap and projects downwardly to an appreciable extent below the bottom of the cap and the bulb of the thermometer is adapted to be normally submerged in the water contained in upper tank or chamber of the radiator. Under ordinary circumstances, this construction enables a more accurate reading, but in the event of a leaking radiator as is very commonly the case, or improper attention to refilling, it frequently occurs that the water level recedes below the thermometer bulb, whereupon all chances of accurate reading are lost. Moreover, it is well known that the fluid in the upper tank or chamber of the radiator in thermo-siphon systems is often non-circulating, except in extreme requirements, and even though the bulb of the thermometer is submerged, an accurate reading cannot be obtained. Many late developments in radiator construction still further effect this condition such as the cutoffs, separate tanks, thermostats, double systems, etc.

Another disadvantage in extending the thermometer for such an appreciable distance below the radiator cap resides in the fact that, in this exposed condition, it is very apt to become broken and great care must be exercised in the frequent removing or replacing the cap for refilling, so that the thermometer tube will not be struck against some metallic part and broken.

The object of the present invention is to provide a thermometer wherein the disadvantages referred to will be obviated, and which will permit of an accurate temperature reading under all conditions.

Exhaustive experimentation has conclusively proven to me that temperature readings cannot be accomplished in either of the ways specifically described, but such experiments have further conclusively shown that accurate readings can be obtained through the employment of the conductive properties of the metallic parts of the radiator. Automobile radiators are usually made from copper or brass, and my experiments have shown that when the water in a radiator becomes hot, all metallic parts of the radiator, including the cap rise or fall in temperature with the water in the radiator, so that the relative temperatures between the cap and the water in the radiator will be the same. On this discovery, I base the method of the present invention which consists in mounting the thermometer so that the bulb thereof will be in metallic contact with some metallic part of the radiator or its cap and employing the conductivity of the metallic parts of the radiator to convey the temperature of the water to the thermometer for the purpose of indicating such water temperature. In order to properly accomplish this with accuracy, the bulb of the thermometer must be partitioned off from the air space in the upper portion of the radiator upper tank so as to prevent the air from interfering with accurate temperature readings.

In the preferred manner of practicing the invention, the thermometer is carried by the radiator cap in such manner that the bulb of the thermometer will not be insulated from the cap, but will receive therefrom and indicate the heat of the cap which is of course conveyed thereto through the filler neck and metallic parts of the upper tank.

A further feature of the invention consists in the ability to read the device at night without employing extraneous lighting means such as flash lights or the like. Further features of the invention will appear from the accompanying drawings, when read in conjunction with the following specification and appended claims.

Another important feature of the invention resides in the great reduction of the number of parts of any prior device, one form of which as placed on the market embodies some thirty separated parts, whereas the present construction can be satisfactorily constructed of but four parts.

The accompanying drawings illustrate a radiator thermometer which has been found practical in the practicing of the method of the present invention, but I am aware that other forms of mechanism may be employed. The showing made in the drawings is for the purpose of illustration, only, and does not define the limits of the invention.

Figure 1 is an elevation of an auto thermometer embodying the present invention with certain parts in central section.

Figure 2 shows the device of Figure 1 with the parts thereof dismantled and shown in section; and, Figure 3 is a section on the line 3—3 of Figure 2.

Referring to the drawings, 1 designates a thermometer provided at its lower end with a bulb 2 and positioned within a holder 3. The bulb and tube holder 3 may be made of any suitable design or configuration, but is shown in the drawings as in the form of a casting provided at its lower end with a reduced threaded portion 4. The holder 3 may be conveniently formed with laterally extending wings 5 providing convenient means for gripping the holder when it is desired to screw the threaded portion 4 into a complementarily threaded socket. In practice, the wings are preferably ornamented or ornate, so as to render the device more aesthetic in appearance.

The thermometer 1 is carried by the holder within a vertical passage thus formed in the casting and the sides of which passage are open so as to permit a reading of the thermometer from either face of the holder. In order that a relatively small thermometer may be employed and yet may be readily read, I preferably use one of substantially rectangular cross section and so shape the channel 6 of the holder that its opposing sides will be substantially V-shaped in cross section. The opposing sides of the channel are preferably covered with a coating 7 of some radioactive material such for example as meso-thorium or any other suitable luminous material, as clearly shown in Figure 3, so that the level of the heat indicating fluid may be readily visible at night and the heat scale as well as the figures associated therewith may be more easily read.

In making the device, I preferably form a pocket 8 in the reduced threaded shank of the holder to receive the bulb 2 of the thermometer tube and in assembling the parts thus far described, the shank of the thermometer tube is passed into the channel of the holder and the bulb 2 bedded in any suitable kind of heat conducting cement 9, such for example as metallic cement. When this heat conducting cement is used, it not only serves to secure the thermometer in place in the holder, but also forms a conductive medium between the bulb 2 and the metal of the reduced shank 4 of such holder. When the parts are thus assembled, the faces of the thermometer tube partake of angular relation to the opposite faces of the holder, as clearly shown in Figure 3. By so positioning the thermometer tube, the refracting properties of the glass from which the thermometer is constructed will effect a magnifying of the heat indicating fluid column 10 in the thermometer tube, whereby its reading and position may be more easily accomplished. In order that a reading may be made, dials or scales 11 are formed on either one or both faces. As the driver's seat of a vehicle is usually at the left side of a car, the thermometer tube should be so positioned that it is seen with maximum magnification from the left hand side of a vehicle. This permits a very small thermometer to be used and will enable clear readings.

The present invention as thus far described, may be associated with an automobile radiator in various ways, such as disclosed in my copending application, filed on even date herewith, but I preferably employ the mounting shown in the accompanying drawings. In the showing of the drawings, 12 designates a radiator cap, which has a closed top, but is provided at the center of its top with a threaded socket 13. It will be clearly noted from Figure 2, that this socket extends only part way through the cap, leaving a partition or wall 14 between the base of the socket and the inside of the cap. The cap 12 is adapted to be associated with the radiator in the usual manner and the threaded shank 4 of the thermometer holder is proportioned to be received into the socket 13. In practice, I preferably first screw a jamb nut 15 on to the threaded shank 4, then screw the threaded shank 4 into the socket 13 and thereafter tighten the jamb nut 15, so as to lock the holder and radiator cap 12 firmly together, in such manner that they will not work loose when subjected to vibration of the engine. The assembled device will appear as shown in Figure 1 of the drawings, from which it will be seen that the radiator cap 12 may be employed to seal the radiator in a conventional way and at the same time serve as a metallic conductor and a support for the thermometer tube holder.

It will be apparent that when the parts are secured together in the manner described, and the radiator cap screwed in position on the radiator, that the heat of the water in the radiator will be conducted through the metallic parts of the upper tank of the radiator to the cap 12, and thence through the threaded shank 4 and conductive cement 9 to the bulb 2 of the frame. The reading obtained from the thermometer by this method has been found to correctly indicate the temperature of the water in the radiator. It will thus appear that the present invention effects an indication of water temperature by a novel method of heat transmission through conductivity, and since the wall 14 partitions off the space occupied by the bulb 2 of the thermometer from the air dome or upper tank of the radiator, it will be apparent that incorrect readings which result from the use of other types of apparatus are thus made impossible. Moreover, scale readings may be obtained irrespective of the liquid levels or other conditions in the upper tank of the radiator.

In order that the thermometer readings may be clearly seen, a colored fluid is preferably employed therein, so that the column will stand out clearly to view. In practice, the thermometer holder is also preferably provided on its opposite faces with colored portions 16 of the same color as the thermometer column. These colored portions 16 are so positioned on the holder that when the heat of the water in the radiator approaches boiling point and the column is caused to rise, its upper end will by this time occupy a position between the colored portions 16, and will serve to fill out the outlines of a circle of color which will attract the attention of the driver and notify him that the water in the radiator is becoming too hot.

It will be apparent moreover that in cold weather the car operator may ascertain by a glance at the thermometer whether or not the cooling system is reaching such a dangerously low temperature as to cause freezing of the cooling fluid.

From what has been said with reference to the invention, it is apparent that the temperature of the liquid is indicated through a device of novel and unique construction, which is caused to function purely through heat transmission, due to conductivity of the metallic parts of the radiator and its cap, and in this respect functions in an entirely different manner from any of the devices now in general use.

Having thus fully described the invention, what I claim as new and desire to secure by Letters Patent is:

1. Means for indicating the temperature of water in an automobile radiator embodying a radiator cap provided on its top with a threaded socket having a closed bottom, a thermometer having a tubular shank provided with a bulb at its base, and a holder for supporting said theremometer with the shank in visible position and provided with a threaded portion adapted to be screwed into the threaded socket of the radiator cap, whereby the bulb of the thermometer is housed in concealed position and partitioned off from the interior of the upper portion of the radiator.

2. Means for indicating the temperature of water in an automobile radiator embodying a metallic radiator cap provided in its top with an interiorly screw threaded socket closed at its bottom, a metallic thermometer holder provided at its base with a socket, a thermometer mounted in the holder with its bulb in the holder socket and conductively associated with the holder, said holder being further provided with a threaded portion adapted to screw into the threaded socket of the cap to establish metallic contact between the holder and the cap and to close both sockets, whereby the bulb of the thermometer is conductively associated with the radiator cap and housed within a closed chamber at the base of said holder.

3. Means for indicating the temperature of water in an automobile radiator embodying a thermometer holder provided with a longitudinal channel open at its opposite sides and the walls of which channel are coated with a radioactive material, a thermometer carried by the holder with the stem of the thermometer extending along the channel and the bulb of the thermometer embedded in conductive cement positioned in a socket at the base of the holder, and a threaded shank on the holder and in which said socket is formed, in combination with a radiator cap provided with an interiorly screw threaded socket adapted to receive the threaded shank of the thermometer holder for mounting the holder on the cap.

4. Means for indicating the temperature of water in an automobile radiator embodying a thermometer holder provided with a longitudinal channel open at its opposite sides and the walls of which channel are coated with a radioactive material, a thermometer carried by the holder with the stem of the thermometer extending along the channel, and the bulb of the thermometer embedded in conductive cement positioned in a socket at the base of the holder, and means for mounting the holder in metallic contact with a radiator.

5. Means for indicating the temperature of water in an automobile radiator embodying a thermometer holder provided with a longitudinal channel open at its opposite sides and the walls of which channel are coated with a radioactive material, a thermometer carried by the holder with the stem of the thermometer extending along the channel and the bulb of the thermometer embedded in conductive cement positioned in a socket at the base of the holder, and means for mounting the holder in metallic contact with a radiator cap.

6. Means for indicating the temperature of water in an automobile radiator embodying a thermometer holder provided with a longitudinal channel open at its opposite sides, a thermometer carried by the holder with the stem of the thermometer extending along the channel and the bulb of the thermometer embedded in conductive cement positioned in a socket at the base of the holder, and a threaded shank on the holder and in which said socket is formed, in combination with a radiator cap provided with an interiorly screw threaded socket adapted to receive the threaded shank of the thermometer holder for mounting the holder on the cap.

7. Means for indicating the temperature of water in an automobile radiator embodying a thermometer holder provided with a longitudinal channel open at its opposite sides, and a thermometer carried by the holder with the stem of the thermometer extending along the channel, and the bulb of the thermometer embedded in conductive cement positioned in a socket at the base of the holder, and means for mounting the holder in metallic contact with a radiator cap.

8. Means for indicating the temperature of water in an automobile radiator embodying a radiator cap provided with a chamber partitioned off from the interior of the cap, a thermometer holder mounted on the cap and supported thereby, and a thermometer supported by the holder and having a tubular shank provided with a bulb housed within the closed chamber of the cap, whereby the bulb is partitioned off from the interior of the upper part of the associated radiator and is dependent for its operation upon the conductivity of the metal parts of the cap.

In testimony whereof, I have signed my name to the foregoing specification.

EDWARD T. CURRAN.